United States Patent [19]

Moriya et al.

[11] Patent Number: 4,807,206

[45] Date of Patent: Feb. 21, 1989

[54] TRACK JUMP DETECTION SYSTEM

[75] Inventors: Mitsuro Moriya, Neyagawa; Toshiji Kanamaru, Katano; Kazuharu Shiragami; Hiroyuki Yamaguchi, both of Hirakata; Katsuya Watanabe, Osaka, all of Japan

[73] Assignee: Matsushita Electric Industrial Co., Ltd., Kadoma, Japan

[21] Appl. No.: 2,069

[22] Filed: Jan. 12, 1987

[30] Foreign Application Priority Data

Jan. 14, 1986 [JP] Japan ................................. 61-5410
Jan. 14, 1986 [JP] Japan ................................. 61-5411
Jan. 20, 1986 [JP] Japan ................................. 61-9156
Jun. 26, 1986 [JP] Japan ............................. 61-150283
Jun. 27, 1986 [JP] Japan ............................. 61-152457

[51] Int. Cl.$^4$ ............................................. G11B 7/00
[52] U.S. Cl. ...................................... 369/32; 369/33; 369/44; 358/907

[58] Field of Search ........................... 369/32, 33-43, 369/44, 47, 50; 360/77, 78, 10.1, 10.2, 10.3, 72.2; 358/342, 907

[56] References Cited

U.S. PATENT DOCUMENTS 4,677,602  6/1987  Okano et al. ...................... 369/33 X

FOREIGN PATENT DOCUMENTS 59-11546  1/1984  Japan.

Primary Examiner—Robert L. Richardson
Attorney, Agent, or Firm—Spencer & Frank

[57] ABSTRACT

A system for recording or reproducing a signal by focusing and irradiating a light beam on a record carrier from a light source while controlling the light beam to always scan the track on the record carrier is disclosed. A track jump that may occur during recording or reproducing a signal on the record carrier is accurately detected. The reliability of the system is thus improved in such a way as to take appropriate action in case of a track jump.

34 Claims, 6 Drawing Sheets

TRACK JUMP DETECTION SYSTEM

BACKGROUND OF THE INVENTION

The present invention relates to a system for recording or reproducing a signal under tracking control. A light beam, generated from a light source and irradiated by being focused on a record carrier, constantly scans the track. More specifically, a track jump detection system detects any track jump which may occur during the recording of a signal on a record carrier or during a reproduction thereof from the record carrier.

An invention related to this type of system is disclosed, for example, by JP-A-No.-59-11546.

In this prior art system, a signal from a track displacement detector is used to detect a track jump of a light beam on a record carrier, and in the case of a track jump that may occur during recording, the light quantity of the light beam is immediately reduced.

According to this prior art system, the light quantity of the light beam sharply increases immediately after starting the recording, often causing a disturbance in the output signal of the track displacement detector, with the result that a track jump is liable to be assumed to stop the recording even when there is no excessive track displacement or track jump occuring.

In the case of a record carrier which, once recorded, cannot be erased for reuse, suspension of the recording makes it impossible to use the particular recording region again, thus reducing the recording capacity.

Even in the case of a record carrier in which the same region can be used for recording after erasure, it takes considerable time for erasure and renewed recording, thereby greatly reducing the data processing speed of the system.

In conventional systems, a track jump associated only with the recording operation is detected, so that a track jump that may occur during reproduction is left unrecognized by the data processing control means and is transmitted directly to devices connected with the system.

In the case of a system device in which image signals recorded on a record carrier are searched for a desired image to be displayed on a monitor, for instance, an erroneous image is undesirably displayed as a result of a track jump.

There is a system in which a track is divided into a multiplicity of sectors capable of recording data of predetermined capacity, and each sector is recorded in advance with an index signal for the purpose of recording or reproducing a signal on the recording carrier. In such a system, when the index signal cannot be read, it is impossible to determine whether the unreadability is attributable to a track jump or a defect of the particular index signal due to a flaw or the like, thus complicating the system processes while at the same time reducing the processing speed.

The recording carrier has a multiplicity of flaws or drop-outs thereon. Conventional systems regard even a minor flaw that poses no problem of track jump for recording or reproducing as a track jump, sometimes leading to a stop of the recording operation for a reduced recording capacity of the record carrier.

SUMMARY OF THE INVENTION

The object of the present invention is to provide track jump detection means having high reliability during the recording operation, and for this purpose, according to the present invention, a signal is not generated from the track jump detection means during a predetermined length of time immediately following the start of recording.

Another object of the invention is to secure highly reliable, accurate track jump detection during the reproduction operation, and for this purpose, a signal is not generated from the track jump detection means during a predetermined length of time immediately after the recording of a signal and light quantity for reproduction is reached.

According to one aspect of the present invention, in the case where the track on the record carrier is comprised of a first region recorded with signals in an uneven form and a second region where signals are recorded in a form different from the first region, a signal is not produced from the track jump detection means during a period of time when the scanning position of the converter means passes through the first region of during a predetermined period of time immediately following the passage through the first region.

According to another aspect of the invention, in order not to apply an erroneous signal to external devices, a reproduction signal is prevented from being transmitted in the event that a signal is generated from the track jump detection means during reproduction of a signal from the record carrier.

A third object of the present invention is to produce a highly reliable track jump detection signal when a flaw or the like on the record carrier occurs, and for this purpose, according to the present invention, a track jump is not assumed to have occured if the signal from the track jump detection means is shorter than a predetermined time duration.

DESCRIPTION OF THE PREFERRED EMBODIMENTS

The present invention will be explained in detail below with reference to the accompanying drawings.

Figure 1:
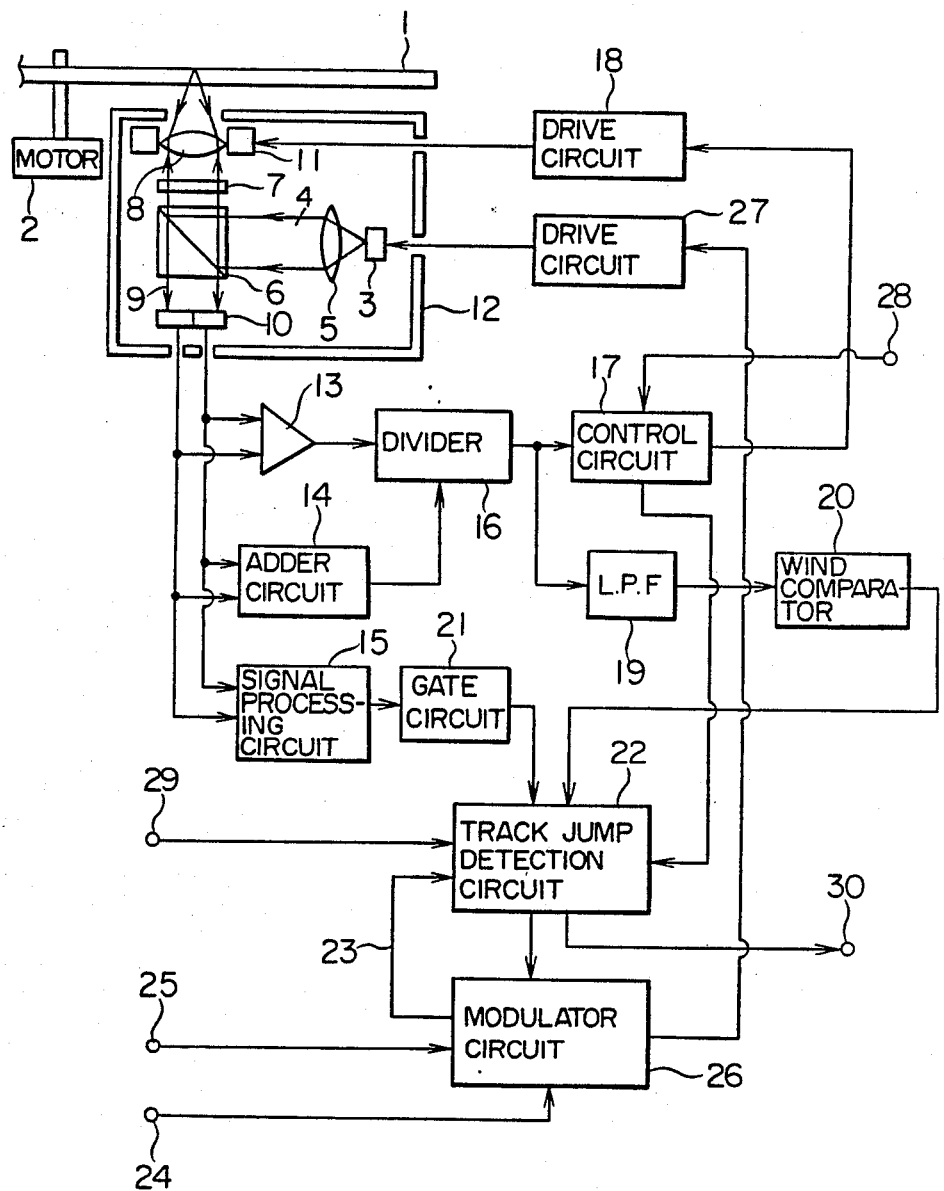
FIG. 1 is a block diagram showing an embodiment of the present invention.

FIG. 1 is a block diagram showing an embodiment of the present invention. A disc-shaped record carrier 1 having an uneven spiral track is fixed on the rotary shaft of a motor 2 and is rotated at a predetermined speed.

A light beam 4 generated from a light source 3 such as a semiconductor laser is converted into a substantially parallel beam at a coupling lens 5 and is reflected on a polarization beam splitter 6. The light beam 4 reflected from the polarization beam splitter 6 passes through a λ/4 plate 7 (λ: Wavelength of the beam 4), and is focused into a diameter of about 1 μm by a focusing lens 8. The light beam thus focused is irradiated on the record carrier 1. The reflected light 9 of the light beam 4 from the record carrier 1 is passed through the focusing lens 8, λ/4 plate 7 and the polarization beam splitter 6 and is irradiated on a photo-detector 10 of two parts-splitted construction.

The focusing lens 8 is fixed on the movable part of a tracking element 11. When a current is applied to the tracking element 11, the focusing lens 8 is moved along a radial direction or a tracking direction and substantially in parallel to the surface of the record carrier 1 by the movable portion.

Also, the light source 3, the coupling lens 5, the polarization beam splitter 6, λ/4 plate 7, the photodetector 10 and the tracking element 11 are fixed on a carriage 12 so as to be moved integrally along the tracking direction.

Two signals from the photo-detector 10 are applied to a differential amplifier 13, an adder circuit 14 and a signal processing circuit 15. The differential amplifier 13 produces a signal corresponding to the difference between the two input signals, the adder circuit 14 a signal corresponding to the sum thereof, and the signal processing circuit 15 reproduces the signal recorded on the record carrier 1 by processing the two input signals, respectively.

The photo-detector 10 is so arranged that the direction of the splitting line thereof is in line with the tracking direction on the photo-detector 10, and the differential amplifier 13 produces a signal representing a positional displacement between the irradiated light beam 4 and the track on the record carrier 1, that is, a track displacement signal.

The signals from the differential amplifier 13 and the adder circuit 14 are applied to a divider 16, which in turn produces a signal corresponding to a value obtained by dividing the signal of the differential amplifier 13 by the signal from the adder circuit 14. The signal from the divider 16 is applied thorugh a control circuit 17 and a drive circuit 18 to provide power amplification to the tracking element 11. The tracking element 11 is subjected to a tracking control in such a manner that the light beam 4 on the record carrier 1 always scans the track.

Figure 2A:
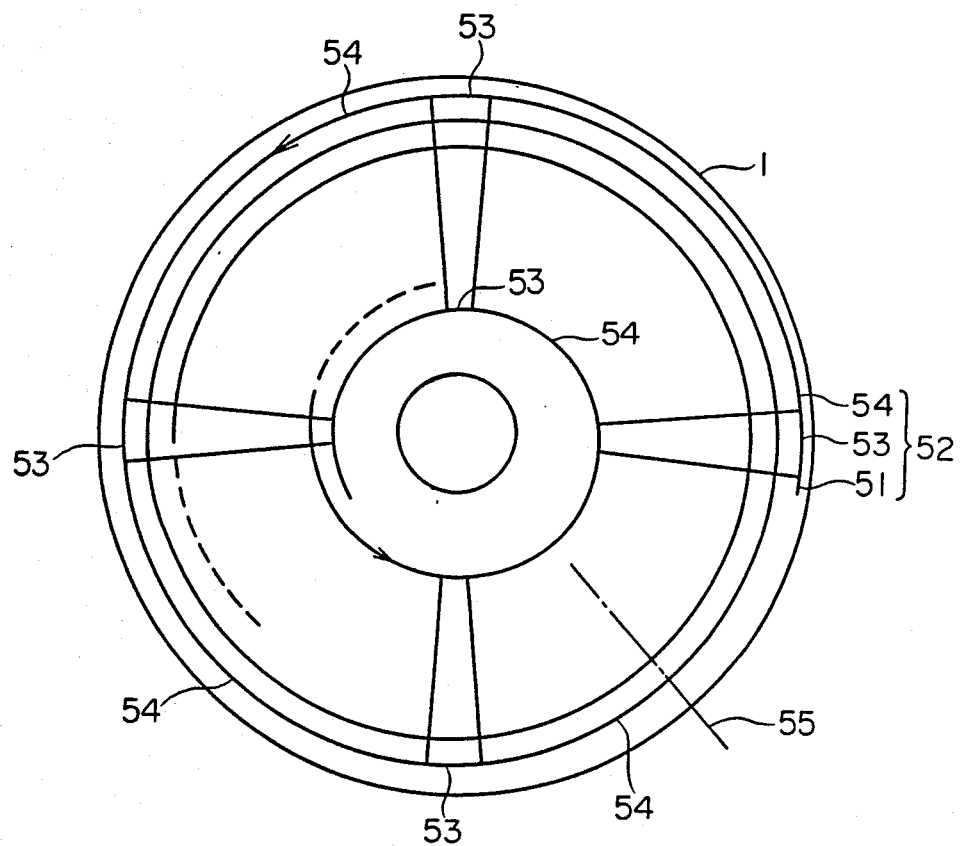
FIGS. 2A and 2B are diagrams for explaining a record carrier.

The record carrier 1 will be explained with reference to FIGS. 2A and 2B. FIG. 2A is a plan view of the record carrier 1 on which a spiral track 51 is cut toward the inner periphery from the outer periphery. The track 51 is divided into sectors 52 capable of recording data of a predetermined capacity. Each sector 52 includes an index region 53 for indexing (hereinafter referred to as "the ID region") and a recording region 54 for recording signals. The embodiment under consideration has four sectors into which a turn of the track is divided.

Figure 2B:
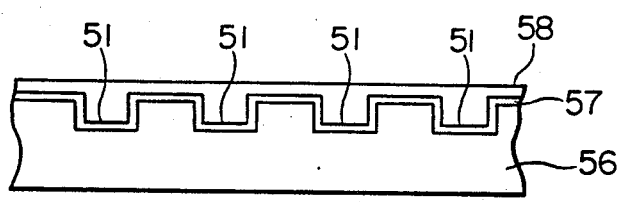

FIG. 2B is an enlarged sectional view showing the record carrier 1 cut along a one-dot chain 55 in FIG. 2A. Numeral 56 designates a base having a slotted track in the surface of polycarbonate resin or the like thereof, numeral 57 a recording material layer subject to change by the heat of the light beam 4, and numeral 58 a protective layer for protecting the recording material layer 57.

An explanation follows about the track jump detection in FIG. 1. The signal from the divider 16 is applied to a wind comparator 20 through a low-pass filter 19 for reducing high-frequency noise. The wind comparator 20 is so constructed that an output signal becomes a low level when the input signal level $V_x$ holds the relationship $V_1 \geq V_x \geq V_2$, and a high level when $V_x \geq V_1$ or $V_x < V_2$, where $V_1$ and $V_2$ are comparator voltage levels for comparing set up in the wind comparator 20 and have relations $V_1 > V_2$.

As described above, the output signal from the differential amplifier 13 indicates a track displacement. When the quantity of the light beam 4 increases twice or doubles, for instance, the output of the differential amplifier 13 against a unit track displacement also doubles. The output signal of the divider 16, which is divided by the output signal of the adder circuit 14, however, is not affected by the light quantity of the light beam 4, variations in reflection factor of the record carrier 1, or variations in sensitivity of the photo-detector 10, but the output thereof remains constant against the unit track displacement. As a result, even when the comparator levels $V_1$, $V_2$ of the wind comparator 20 are kept constant, the amount of track displacement detected is fixed, thereby making stable detection possible.

A gate circuit 21 is for producing a signal representing the ID region 53 shown in FIG. 2A from the output signal of the signal processing circuit 15, and supplies this signal to a track jump detection circuit 22.

The circuit configuration of the gate circuit 21 will be explained with reference to FIG. 3.

The signal outputtted from the signal processing circuit 15 is applied through an input terminal 61 to a pattern detection circuit 62. The pattern detection circuit 62 detects a special pattern recorded on the ID region 53 shown in FIG. 2A and supplies a pulse signal to an AND gate 63. When the signal is applied from the AND gate 63 to a monostable multivibrator 64, the output signal level of the monostable multivibrator 64 changes from high to low, and after a predetermined length of time, the output becomes a high level again. An edge detection circuit 65 detects that the output of the monostable multivibrator 64 has changed from high to low level, and applies the resultant signal to a monostable multivibrator 67 through an OR circuit 66.

Assume that the period of the pulse signal detected by the pattern detection circuit 62, that is, the period of the ID region 53 shown in FIG. 2 is $T_0$, and that the period during which the monostable multivibrator 64 remains low by the applied signal is $T_1$. The relationship between $T_0$ and $T_1$ is so set that $T_0 > T_1$, and therefore a false actuation is prevented as the result of a pseudo-pulse being produced by the pattern detection circuit 62 when the output of the monostable multivibrator 62 is at a low level.

The multivibrator 67 is retriggerable, and is so constructed that the output thereof is maintained at a high level as long as a pulse is applied thereto for a duration equal to or less than a predetermined period $T_2$ ($T_2 > T_0$). The edge detection circuit 68 detects that the output of the monostable multivibrator 67 has changed from a high to a low level, and applies a pulse signal to the OR circuit 66.

Accordingly, even in the case where a pulse signal is not generated at the output terminal of the edge detection circuit 65, the OR circuit 66 is provided with pulses having a period of $T_2$. Thus, even when no pulse signal is produced from the pattern detection circuit 62 due to a flaw or defect in the ID region 53 shown in FIG. 2A, an equivalent pulse is applied to the OR circuit 66.

The period $T_2$ should preferably take a value as near to $T_0$ as possible. Rotational variations of the record carrier 1, however, should be taken into consideration in setting the value of the period $T_2$.

The operation of the gate circuit 21 shown in FIG. 3 will be explained further with reference to the timing chart of FIG. 4.

A operation $T_2$ should preferably take a value as near to $T_0$ as possible. Rotational variations of the record carrier 1, however, should be taken into consideration in setting the value of the period $T_2$.

The operation of the gate circuit 21 shown in FIG. 3 will be explained further with reference to the timing chart of FIG. 4.

A waveform A is an input signal to the input terminal 61. Numeral 71 designates a period of the ID region 53 shown in FIG. 2A, and numeral 72 a period of the recording region 54. The ID region 53 includes an ID mark 73 and an address signal. Data 1 and 2 are recorded respectively in the recording regions of addresses $A_0$ and $A_2$. Numeral 74 designates a pseudo-ID mark, which indicates the lack of the ID mark for the address $A_2$. A waveform B is an output waveform of the pattern detection circuit 62, a waveform C an output waveform of the monostable multivibrator 64, a waveform D an output waveform of the edge detection circuit 65, and a waveform E an output waveform of the OR circuit 66.

As shown in waveform C, the output of the monostable multivibrator 64 lacks the pseudo-ID mark 74, and as shown in the waveform E, the output of the OR circuit 66 is supplemented with an equivalent ID mark 76 of the address $A_2$.

Referring to FIG. 1, explanation will be made of the operation for preventing a false actuation with a track jump during the recording operation.

Numeral 24 designates an input terminal for a recording period signal, numeral 25 an input terminal for a recording signal, numeral 26 a modulator circuit for producing a signal for modulating the light source 3 in accordance with the signals of the input terminals 24 and 25, and numeral 27 a drive circuit for driving the light source 3 in accordance with the output signal of the modulator circuit 26.

A track jump of the light beam 4 that may occur on the record carrier 1 is detected by the wind comparator 20. It may happen, however, that there is noise in the output of the divider 16 at the start or immediately after the end of the recording operation, which causes a false actuation of the wind comparator 20 and produces a pulse that assumes and this indicates a track jump without any actual track jump occurring.

In order to prevent this false detection, the modulator circuit 26 applies a recording period signal through a line 23 to the track jump detection circuit 22. The track jump detection circuit 22, upon receipt of such a signal, detects the start and end of the recording operation, while ignoring the output signal of the wind comparator 20 immediately after the start and end of recording, respectively.

Generally, the shock resistance of a device is sufficient at about 5G (G: Acceleration of gravity, 1G=9.8 m/sec$^2$).

If a shock of 5G is imposed under an inoperative track control, a track of 1.6 μm pitch is crossed at 256 μsec.

During recording when the tracking control is working, however, a track jump is prevented. The capability to prevent a track jump, depending on the tracking control system involved, is at least about 3G. Under a shock of 5G, if any, therefore, a track jump is caused actually at the same rate as if a shock of 2G is imposed.

When an allowable track displacement is assumed to be 0.4 μm, it takes 286 μsec for a displacement of 0.4 μm under a shock of 2G. Should a shock be imposed accidentally at the same time as the start of recording, it takes about 300 μsec for a track displacement of 0.4 μm. Therefore, no problem is posed if the time for ignoring the output signal of the wind comparator 20, immediately after the start and end of recording, is set equal to or less than 300 μsec.

In the ID region 53 shown in FIG. 2A, the signals given by the uneven portions are recorded. During the period when the light beam 4 on the record carrier 1 is passing through the ID region 53, therefore, a disturbance may occur in the output of the divider 16 thereby disturbing the tracking control, with the result that wind comparator 20 is likely to produce a pulse which falsely assumes a track jump in spite of the absence of one. In order to prevent this false detection, the track jump detection circuit 22 is adapted to detect the scanning of the light beam 4 on the ID region 53 from the output signal of the gate circuit 21, that is, the signal from the output terminal 69 of FIG. 3, while ignoring the output of the wind comparator 20 during and immediately after the scanning of the ID region 53.

The track 51 on the record carrier 1, on the other hand, is of spiral form, and therefore if left to stand while in tracking control, the light beam 4 on the record carrier 1 undesirably shifts from the outer periphery to the inner periphery. To avoid this inconvenience, a still operation is performed to scan the same track during the tracking control.

This still operation will be briefly explained. Upon application to the input terminal 28 of a pulse representing a turn of the record carrier 1, the control circuit 17 renders the tracking control inoperative, and applies an acceleration pulse to the tracking element 11 thereby shifting the light beam 4 on the record carrier 1 toward the outer periphery. In this way, a crossing of the track is detected and a deceleration pulse for braking is applied to the tracking element 11, followed by the energizing of the tracking control again for scanning the same track.

This still operation involves a track jump, which is forced and need not be detected. The track jump detection circuit 22 detects a still operation from the output signal of the control circuit 17, and during the period of the still operation, ignores the output signals of the wind comparator 20.

The input terminal 29 inputs a signal for preventing detection of a track jump that may occur during a period other than the recording period. For example, the input terminal 29 is supplied with a signal representing a signal read period, only during which the track jump detection circuit 22 is constructed to detect a track jump.

The operation after detecting a track jump by the track jump detection circuit 22 will now be explained.

In the event that a track jump is detected during recording, the track jump detection circuit 22 suspends the recording operation immediately by applying a signal to the modulator circuit 26, while at the same time informing a data processing unit controlling the system through the output terminal 30 that a track jump has occurred. The data processing unit records a mark, indicating the invalidity on the sector involved, and records a signal on a new sector. If a track jump is detected during reproduction, in contrast, the track jump detection circuit 22 informs the data processing unit through the output terminal 30 that a track jump has occurred. The data processing unit searches for the desired track again and reads a signal. In this way, it is possible to produce a reproduction signal which his reliable.

Figure 5:
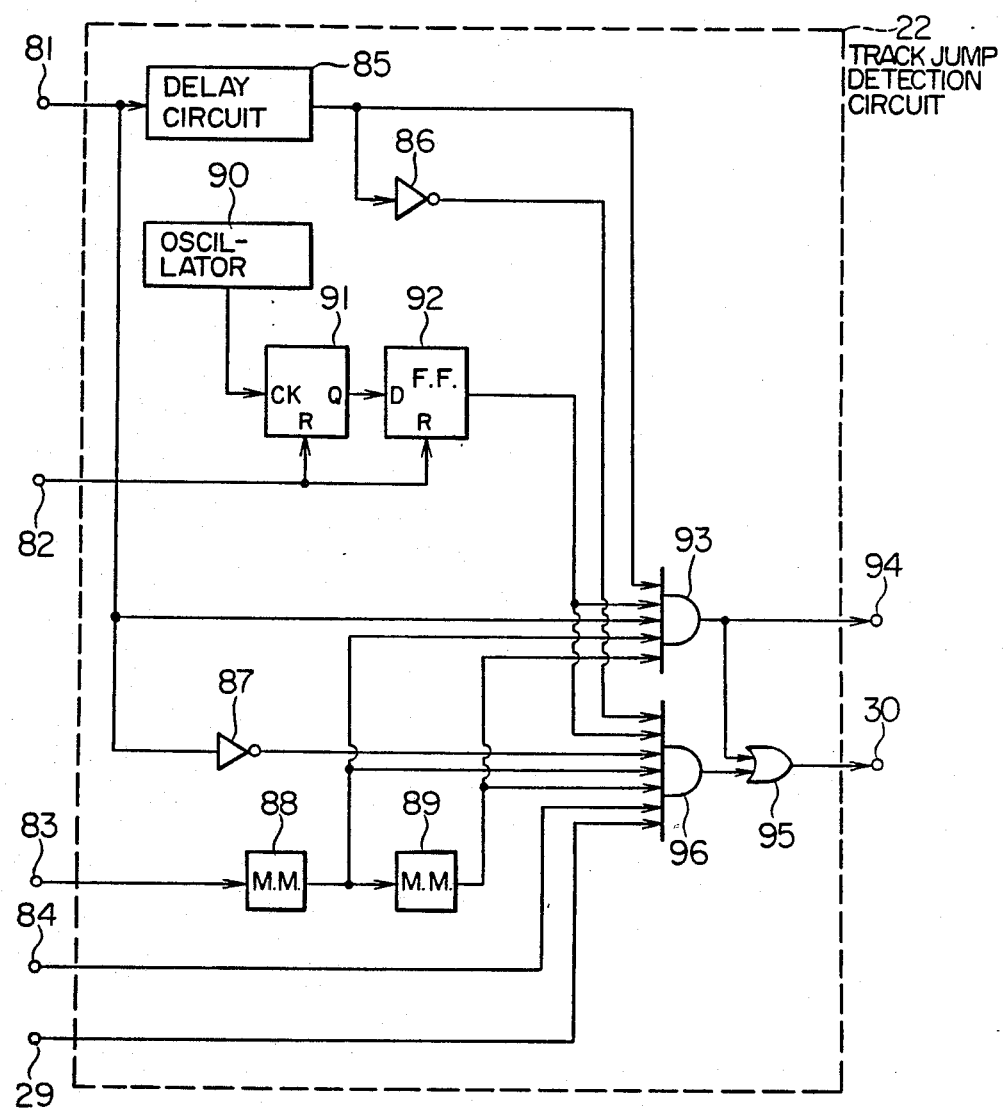
FIG. 5 is a block diagram showing a track jump detection circuit, FIG. 6 (A through (M) - are timing charts for explaining the operation of the track jump detection circuit, FIG. 7 is a block diagram showing another embodiment of the gate circuit.

A configuration of the track jump detection circuit 22 will be explained with reference to FIG. 5.

Numeral 81 designates an input terminal of a recording period signal applied through a line 23 of FIG. 1, numeral 82 an input terminal for applying a signal from the wind comparator 20, numeral 83 an input terminal for applying a signal from the gate circuit 21, and numeral 84 an input terminal for applying a still operation period signal from the control circuit 17, which signal remains low only during the still operation.

Numeral 85 designates a delay circuit for delaying the signal of the input terminal 81 by a predetermined time, numerals 86 and 87 reversing circuits for inverting the signal of the input terminal 81, numeral 88 a monostable multivibrator which switches from high to low state in synchronism with the rise of the signal of the input terminal 83 and shifts to high state again after a predetermined time $T_3$, and numeral 89 designates a monostable multivibrator which switches from low to high state in synchronism with the fall of the output signal of the monostable multivibrator and turns to low state again after the lapse of a predetermined time $T_4$.

Figure 3:
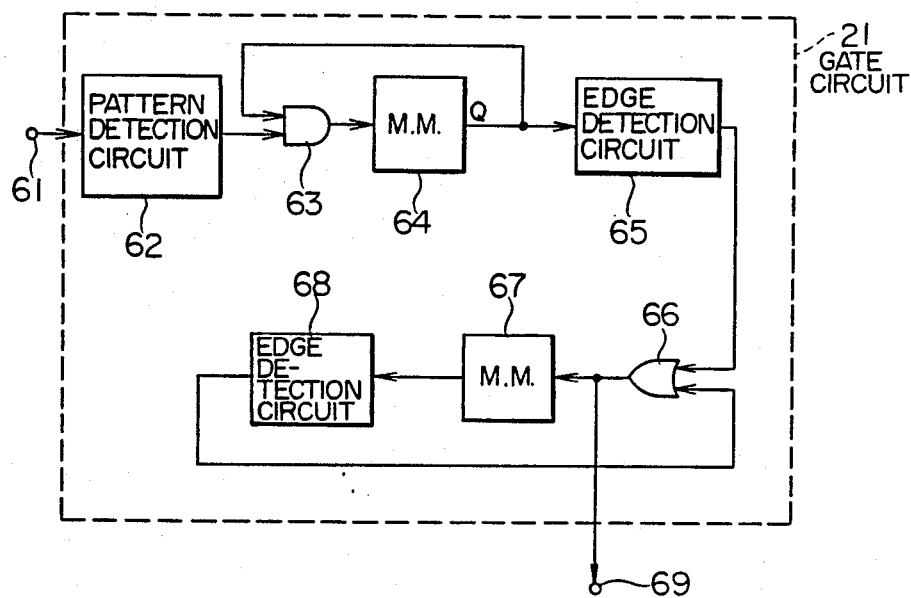
FIG. 3 is a block diagram showing a gate circuit.
Figure 4:
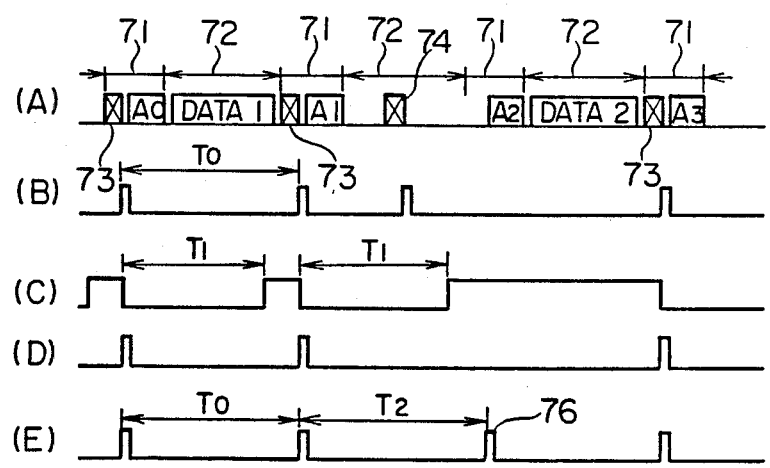
FIGS. 4 (A) through (E) are timing charts for explaining the operation of the gate circuit.

The relations between the periods $T_0$, $T_3$ and $T_4$ of the pulse signal produced from the pattern detection circuit 62 shown in FIG. 3 are set to hold $T_3 < T_4 < T_0$.

Numeral 90 designates an oscillator for generating a rectangular wave signal of, say, 10 MHz, and numeral 91 a counting circuit.

The counting circuit 91 counts pulses from the oscillator 90 when the input terminal 82 enters a high state, and when this count exceeds a predetermined value, the output thereof turns to high state. As long as the input terminal 82 remains at a low state, the counting operation is of course suspended with the output of the counting circuit 91 in the low state.

Numeral 92 designates a D-type flip-flop. When the input terminal 82 thereof is in a low state, the output thereof is also in a low state. On the other hand, when the input terminal 82 is high when the output of the counting circuit 91 in a high state the output of the flip-flop 92 also becomes high.

As a consequence, even if a pulse signal is produced from the wind comparator 20 due to a flaw on the record carrier 1, the flip-flop 92 will not produce any output as long as the duration of the pulse is shorter than $T_5$. Assuming that the period of the oscillator 90 is $T_6$ and the count required for the output of the counting circuit 91 to reach a high state is N, then the duration $T_5$ is given as $T_6 \times N$. The time $T_5$ is set to 200 to 300 microseconds or less during which no track jump occurs.

The AND circuit 93 is supplied with signals from the input terminal 81, the delay circuit 85, the flip-flop 92 and the monostable multivibrators 88 and 89, and produces a signal corresponding to the logic product of these signals.

The signal produced at the output terminal 94 of the AND circuit 93 is applied to the OR circuit 95 and the modulator circuit 26 of FIG. 1 respectively. If a track jump occurs after a predetermined time opened from the start of recording, the signal of the flip-flop 92 is applied through the modulator circuit 26 and the output terminal 30 to the data processing unit.

The AND circuit 96 is supplied with signals from the reversing circuits 86, 87, the flip-flop 92, the monostable multivibrators 88, 89, and the input terminals 29, 84, and produces a signal corresponding to the logic product of these signals.

Figure 6:
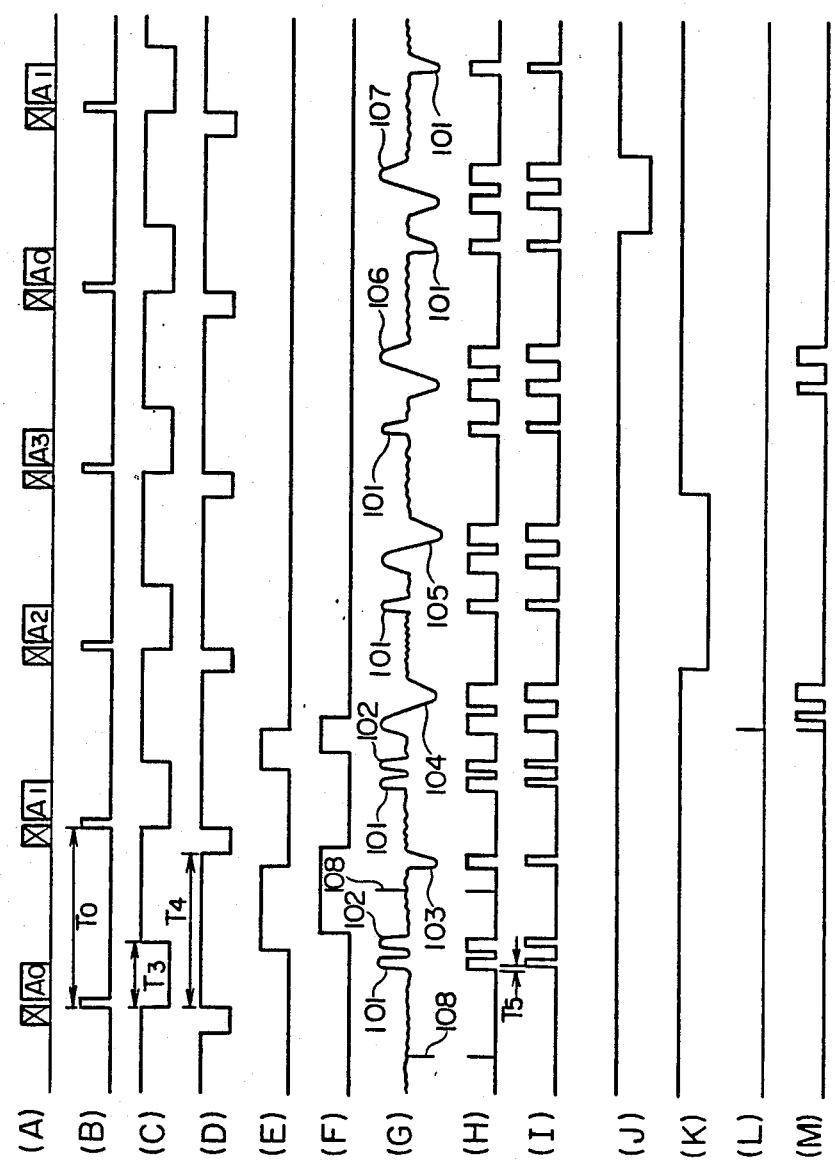

The operation of the track jump detection circuit 22 will be explained with reference to the timing chart of FIG. 6.

The waveform A represents a signal from the signal processing circuit 15 shown in FIG. 1, the waveform B a signal from the input terminal 83, that is, the gate circuit 21, the waveform C a signal from the monostable multivibrator 88, the waveform D a signal from the monostable multivibrator 89, the waveform E a signal from the input terminal 81, that is, a signal representing the recording period, the waveform F a signal from the delay circuit 85, the waveform G a signal from the low-pass filter 19, the waveform H a signal from the input terminal 82, that is, the wind comparator 20, the waveform I a signal from the flip-flop 92, the waveform J a signal from the input terminal 84, that is, the control circuit 17 representing the still operation period, the waveform K a signal from the input terminal 29, and the waveform L a signal from the AND circuit 93, and the waveform M a signal from the OR circuit 95.

Referring to the waveform G, numeral 101 designates a track displacement caused from the disturbance of the tracking control by the ID region 53. Nevertheless, signals from the monostable multivibrators 88, 89 prevent the AND circuit 93 and OR circuit 95 from producing a signal representing a track jump. Numeral 102 designates a disturbance caused at the start of recording, and numeral 103 a disturbance caused at the end of recording. Signals from the delay circuit 85 and the input terminal 81 prevent the AND circuit 93 and the OR circuit 95 from producing a signal representing a track jump. Numeral 104 designates a case in which a track jump has occurred during recording. When data on the occurrence of a track jump is sent from the AND circuit 93 to the modulator circuit 26 of FIG. 1, the modulator circuit 26 immediately stops recording by closing the recording gate. Numerals 105 and 106 designate an occurrence of a track jump during reproduction. When a track jump like 105 occurs, the input terminal 29 is in low state, so that a signal representing a track jump will not be applied to the OR circuit 95. When a track jump like 106 occurs, on the other hand, the input terminal 29 is in high state, and therefore, a signal showing the occurrence of a track jump is applied to the OR circuit 95. Numeral 107 designates a still track jump, and since the signal of the input terminal 84 (waveform J) is low, indicating a still operation period, the OR circuit 95 is not supplied with a signal representing on occurrence of a track jump.

Numeral 108 designates a disturbance pulse caused by a flaw on the record carrier 1. Although a pulse is produced in the waveform H, that is, the output of the wind comparator 20 according to the disturbance pulse, in the output of the flip-flop 92, that is, the waveform I a pulse is not produced because the pulse duration of the disturbance pulse is shorter than $T_5$.

Figure 7:
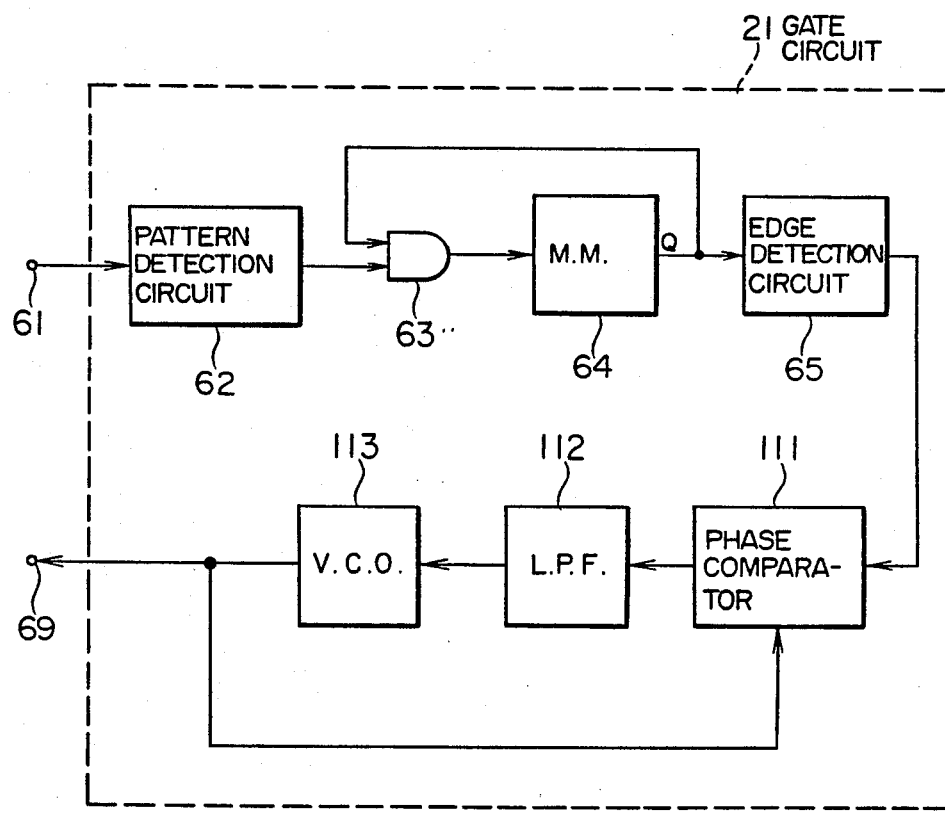

The gate circuit 21 shown in FIG. 1 may be configured in the manner shown in FIG. 7. In FIG. 7, the same component parts as those in FIG. 3 are designated by the same numerals and are not described.

Numeral 111 designates a phase comparator, numeral 112 a low-pass filter, and numeral 113 a voltage controlled oscillator for producing a signal of a frequency corresponding to an input voltage thereto.

The phase comparator 111 compares the signal of the edge detection circuit 65 with the signal of the voltage controlled oscillator 113 and produces a signal corresponding to the phase difference between them.

The signal of the phase comparator 111 is applied through the low-pass filter 112 to the voltage controlled oscillator 113. Even if the ID mark 73 shown in FIG. 4 is lacking, therefore, the output of the voltage controlled oscillator 113 is supplemented with the ID mark.

As explained with reference to FIG. 3, the output of the edge detection circuit 65, which may lack the ID mark, rarely contains a pseudo-ID mark. If the phase comparator 111 is so configured that the phases are compared only upon production of the signal from the edge detection circuit 65, therefore, the disturbance that occurs due to the lack of the ID mark is reduced, thereby further improving the accuracy of the signal of the voltage controlled oscillator 113.

The present invention which is explained in detail above is not limited to the embodiments described.

Instead of the construction in which the signals from the wind comparator 20 are ignored during, immediately before and after the ID region 53, for example, the system of the present invention may be so constructed that the same signals are ignored only immediately after the ID region 53.

Also, without detecting the scanning of the ID region 53 by the light beam 4 from the siganl of the signal processing circuit 15, the system may be so constructed as to detect the rotations of the motor 2.

The track jump detection means may be constructed to determine the signal of the wind comparator 20 with a microprocessor or the like. In this case, if software is prepared in such a manner as to avoid checking the signal of the wind comparator 20 for a predetermined period immediately after the start of recording, for a predetermined period immediately after the end of recording, or for the period immediately following the ID region 53, the false actuation which otherwise might be caused by the disturbance that occurs during these periods may be prevented. Further, it is of course possible to determine with a microprocessor whether the output pulse of the wind comparator 20 has a duration longer than a predetermined time length.

As will be understood from the detailed foregoing description, according to the present invention, a track jump signal that occurs in pseudo fashion immediately after the start of recording is capable of being detected, and therefore, the data processing speed of the system or the storage capacity may be maintained rather than reduced thereby permitting an accurate and efficient recording.

Further, the accurate detection of a track jump according to the present invention of course prevents the data processing speed of the system from being decreased, thereby greatly improving the reliability.

Furthermore, a pseudo track jump signal generated by a minor flaw or the like of the record carrier is removed, thereby improving the yield of the record carrier for a saving in the cost of the recording carrier.

What is claimed is:

1. A track jump detection system comprising:
means for focusing a light beam from a light source and irradiating said focused light beam on a record carrier having tracks used for recording an applied signal,
means for shifting said light beam on said record carrier along a direction across said track,
track displacement detection means for detecting a positional displacement between said track and said light beam on the basis of light reflected from or transmitted through said record carrier,
tracking control means for controlling said light beam on said record carrier for positioning said light beam on said track, said tracking control means driving said shifting means in accordance with a positional displacement signal output from said track displacement detection means,
means for recording said applied signal on said record carrier and for changing the intensity of said light beam on the basis of said applied signal, and
off-track detection means for detecting when said light beam is positioned within a predetermined range in said track by said positional displacement signal, and for generating an alarm signal when said light beam is out of said predetermined range, said off-track detection means being prevented from generating said alarm signal during a predetermined period immediately after said recording means starts the recording operation, and said recording means stopping the recording operation when said off-track detection means generates said alarm signal.

2. A track jump detection signal according to claim 1, wherein said positional displacement signal has a lever of Vo when said light beam is positioned at a center line of said track on said record carrier, a pair of signals V1 and V2, wherein V1 is greater than V2 and V1 and V2 have a symmetrical relationship with respect to Vo, defines said predetermined range and said off-track detection means decides whether said positional displacement signal having a level of Vx exists within asid predetermined range between V1 and V2, and generates said alarm signal when Vx>V1 or Vx<V2.

3. A track jump detection system according to claim 1, wherein said off-track detection means includes
comparator means for comparing said positional displacement signal having a level of Vx with said predetermined range defined by two predetermined levels V1 and V2 wherein V1>V2, said comparator means outputting a pulse signal when Vx>V1 or Vx<V2, and
deciding means for deciding whether a time period while said comparator means generates said pulse signal exceeds a predetermined count and for generating an excess signal when said time period exceeds said predetermined count.

4. A track jump detection system according to claim 3, wherein said levels of V1 and V2 are set in a symmetrical manner with a level Vo being defined when said light beam on said record carrier is positioned at a center line of said track.

5. A track jump detection system comprising:
means for focusing a light beam from a light source and irradiating said focused light beam on a record carrier having tracks used for recording an applied signal,
means for shifting said light beam on said record carrier along a direction across said track,
track displacement detection means for detecting a positional displacement between said track and said light beam on the basis of light reflected from or transmitted through said record carrier,
tracking control means for controlling said light beam on said record carrier for positioning said light beam on said track, said tracking control means driving said shifting means in accordance with a positional displacement signal output from said track displacement detection means, means for recording siad applied signal on said record carrier and for changing the intensity of said light beam on the basis of said applied signal, and off-track detection means for detecting when said light beam is positioned within a predetermined range in said track by said positional displacement signal, and for generating an alarm signal when said light beam is out of said predetermined range, said off-track detection means being prevented from generating said alarm signal during a predetermined period immediately after said recording means ends the recording operation.

6. A track jump detection system according to claim 5, wherein said positional displacement signal has a level of Vo when said light beam is positioned at a center line of said track on said record carrier, a pair of signals V1 and V2, wherein V1 is greater than V2 and V1 and V2 have a symmetrical relationship to Vo, defines said predetermined range, and said off-track detection means decides whether said positional displacement signal having a level of Vx exists within said predetermined range between V1 and V2, and generates said alarm signal when Vx>V1 or Vx<V2.

7. A track jump detection system according to claim 5, wherein said off-track detection means includes comparator means for comparing said positional displacement signal having a level of Vx with said predetermined range defined by two predetermined levels V1 and V2 wherein V1>V2, said comparator means outputting a pulse signal when Vx>V1 or Vx<V2, and deciding means for deciding whether a time period while said comparator means generates said pulse signal exceeds a predetermined count and for generating an excess signal when said time period exceeds for predetermined count.

8. A track jump detection system according to claim 7, wherein said levels of V1 and V2 being set in a symmetrical manner with a level Vo are defined when said light beam on said record carrier is positioned at a center line of said track.

9. A track jump detection system used in a system for reproducing an applied signal from a record carrier having a track includign alternately a first region with a first applies siganl recorded in an uneven form and a second region with a second applies signal recorded or for recording a second applied signal in a form different from said first applied signal recorded in said first region, comprising:

means for focusing a light beam from a light source and irradiating said focused light beam on said record carrier, means for shifting said light beam on said record carrier along a direction across said track, track displacement detection means for detecting a positional displacement between said track and said light beam on the basis of light reflected from or transmitted through said record carrier, tracking control means for controlling said light beam on said record carrier for positioning said light beam on said track, said tracking control means driving said shifting means in accordance with a positional displacement signal output from said track displacement detection means, means for reproducing said applied signal recorded on said record carrier on the basis of said light reflected from or transmitted through said record carrier, period detection means for detecting a period while said light beam passes said first region or for detecting a predetermined period immediately after said light beam passes said first region on the basis of said applied signal of said reproducing means, and off-track detection means for detecting when said light beam is positioned within a predetermined range in said track by said positional displacement signal being produced by said track displacement detection means, and for generating an alarm signal when said light beam is out of said predetermined range, said off-track detection means being prevented from generating said alarm signal while said period detection means generates a detection signal.

10. A track jump detection system according to claim 9, wherein said positional displacement signal has a level of Vo when said light beam is positioned at a center line of said track on said record carrier, a pair of signals V1 and V2, wherein V1 is greater than V2 and V1 and V2 have a symmetrical relationship with respect to Vo defines said predetermined range, and said off-track detection means decides whether said positional displacement signal having a level of Vx exists within said predetermined range between V1 and V2, and generates said alarm signal when Vx>V1 or Vx<V2.

11. A track jump detection system according to claim 9, wherein said off-track detection means includes comparator means for comparing said positional displacement signal having a level of Vx with said predetermined range deifned by two predetermined levels V1 and V2 wherein V1>V2, said comparator means outputting a pulse signal when Vx>V1 or Vx<V2, and deciding means for deciding whether a time period while said comparator means generates said pulse signal exceeds a predetermined count and for generating an excess signal when said time period exceeds said predetermined count.

12. A track jump detection system according to claim 11, wherein said levels of V1 and V2 are set in a symmetrical manner with a level Vo being defined when said light beam on said record carrier is positioned at a center line of said track.

13. A track jump detection system according to claim 9, wherein said period detection means generates a substitute signal when said reproducing means fails to detect said first region after a predetermined time passes.

14. A track jump detection system according to claim 9, wherein said period detection means detects asid predetermined period while said light beam passes said first region or detects said predetermined period immediately after said light beam passes said first region, on the basis of a first region signal detected by said reproducing means.

15. A track jump detection system according to claim 9, said period detection means including first detection means for detecting said first region by said applies signal of said reproducing means, voltage control oscillating means for changing frequency of its output signal in accordance with its input signal, comparator means for comparing a phase of said detection signal of said first detection means with a phase of said output signal of said voltage control oscillating means and generaging a difference signal in accordance with a difference between said two phases, and said voltage control oscillating means being controlled by said difference signal of said comparator means.

16. A track jump detection system comprising:

means for focusing a light beam from a light source and irradiating said focused light beam on a record carrier having tracks used for recording an applied signal, means for shifting said light beam on said record carrier along a direction across said track, track displacement detection means for detecting a positional displacement between said track and said light beam on the basis of light reflected from or transmitted through said record carrier, light quantity detection means for detecting light quantity of said light reflected from or transmitted through said record carrier, dividing means for dividing a positional displacement signal of said track displacement detection means by a light quality signal of said light quantity detection means, tracking control means for controlling said light beam on said record carrier for positioning said light beam on said track, said tracking control means driving said shifting means in accordance with said positional displacement signal output from said track displacement detection means, and off-track detection means for detecting when said light beam is positioned within a predetermined range in said track by a divide signal output by said dividing means, and generating an alarm signal when said light beam is out of said predetermined range.

17. A track jump detection system according to claim 16, wherein said positional displacement signal has a level of Vo when said light beam is positioned at a center line of said track on said record carrier, a pair of signals V1 and V2, wherein V1 is greater than V2 and V1 and V2 have a symmetrical relationship with respect to Vo defines said predetermined range, and said off-track detection means decides whether said positional displacement signal having a level of Vx exists within said predetermined range between V1 and V2, and generates said alarm signal when Vx>V1 or Vx<V2.

18. A track jump detection system according to claim 16, wherein said off-track detection means includes comparator means for comparing said dividing signal having a level of Vx with said predetermined range defined by two predetermined levels V1 and V2 wherein V1>V2, said comparator means outputting a pulse signal when Vx>V1 or Vx<V2, and deciding means for deciding whether a time period while said comparator means generates said pulse signal exceeds a predetermined count and for generating an excess signal when said time period exceeds said predetermined count.

19. A track jump detection system according to claim 18, wherein said levels of V1 and V2 are set in a symmetrical manner with a level of Vo being defined when said light beam on said record carrier is positioned at a center line of said track.

20. A track jump detection system comprising:

means for focusing a light beam from a light source and irradiating said focused light beam on a record carrier having tracks used for recording an applied signal, means for shifting said light beam on said record carrier along a direction across said track, track displacement detection means for detecting a positional displacement between said track and said light beam on the basis of light reflected from or transmitted through said record carrier, light quantity detection means for detecting light quantity of said light reflected from or transmitted through said record carrier, dividing means for dividing a positional displacement signal of said track displacement detection means by a light quality signal of said light quantity detection means, tracking control means for controlling said light beam on said record carrier for positioning said light beam on said track, said tracking control means driving said shifting means in accordance with said positional displacement signal output from said track displacement detection means, means for recording said applied signal on said record carrier and changing the intensity of said light beam on the basis of said applied signal, and off-track detection means for detecting when said light beam is positioned within a predetermined range in said track by a divide signal produced by said dividing means, and generating an alarm signal when said light beam is out of said predetermined range, said off-track detection means being prevented from generating said alarm signal during a predetermined period immediately after said recording means starts the recording operation, and said recording means stopping the recording operation when said off-track detection means generates said alarm signal.

21. A track jump detection system according to claim 20, wherein sadi positional displacement signal has a level of Vo when said light beam is positioned at a center line of said track on said record carrier, a pair of signals V1 and V2, wherein V1 is greater than V2 and V1 and V2 have a symmetrical relationship with respect to Vo defines said predetermined range, and said off-track detection means deciding whether said divide signal having a level of Vx exists within said predetermined range between V1 and V2, and generates said alarm signal when Vx>V1 or Vx<V2.

22. A track jump detection system according to claim 20, wherein said off-track detection means includes comparator means for comparting said divide signal having a level of Vx with said predetermined range defined by two predetermined levels V1 and V2 wherein V1>V2, said comparator means outputting a pulse signal when Vx>V1 or Vx<V2, and deciding means for deciding whether a time period while the comparator means generates said pulse signal exceeds a predetermined count and for generating an excess signal when said time period exceeds said predetermined count.

23. A track jump detection system according to claim 22, wherein said levels of V1 and V2 are set in a symmetrical manner with a level Vo being defined when said light beam on said record carrier is positioned at a center line of said track.

24. A track jump detection system comprising:

means for focusing a light beam from a light source and irradiating said focused light beam on a record carrier having tracks used for recording an applied signal, means for shifting said light beam on said record carrier along a direction across said track, track displacement detection means for detecting a positional displacement between said track and said light beam on the basis of light reflected from or transmitted through said record carrier, light quantity detection means for detecting light quantity of said light reflected from or transmitted through said record carrier, dividing means for dividing a positional displacement signal of said track displacement detection means by a light quality signal of said light quantity detection means, tracking control means for controlling said light beam on said record carrier for positioning said light beam on said track, said tracking control means driving said shifting means in accordance with said positional displacement signal output from said track displacement detection means, means for recording said applied signal said record carrier and changing the intensity of said light beam on said basis of said applied signal, and off-track detection means for detecting when said light beam is positioned within a predetermined range in said track by a divide signal of said dividing means, and generating an alarm signal when said light beam is out of said predetermined range, said off-track detection means being prevented from generating said alarm signal during a predetermined period immediately after said recording means starts the recording operation, and said recording means stopping the recording operation when said off-track detection means generates said alarm signal ending the recording operation.

25. A track jump detection system according to claim 24, wherein said divide signal has a level of Vo when said light beam is positioned at a center line of said track on said record carrier, a pair of signals V1 and V2, wherein V1 is greater than V2 and V1 and V2 have a symmetrical relationship with respect to Vo defines said predetermined range, and said off-track detection means decides whether said divide signal having a level of Vx exists within said predetermined range between V1 and V2, and generates said alarm signal when Vx>V1 or Vx<V2.

26. A track jump detection system according to claim 24, wherein said off-track detection means includes comparator means for comparing said divide signal having a level of Vx with said predetermined range defined by two predetermined levels V1 and V2 wherein V1>V2, said comparator means outputting a pulse signal when Vx>V1 or Vx<V2, and deciding means for deciding whether a time period while said comparator means generates said pulse signal exceeds a predetermined count and for generating an excess signal when said time period exceeds said predetermined count.

27. A track jump detection system according to claim 26, wherein said levels of V1 and V2 are set in a symmetrical manner with a level Vo being defined when said light beam on said record carrier is positioned at a center line of said track.

28. A track jump detection system used in a system for reproducing an applied signal from a record carrier having a track including alternately a first region with a first applied signal recorded in an uneven form and a second region with a second applied signal recorded or for recording a second applied signal in a form different from said first applied signal recorded in said first region, comprising:

means for focusing a light beam from a light source and irradiating said focused light beam on said record carrier, means for shifting said light beam on said record carrier along a direction across said track, track displacement detection means for detecting a positional displacement between said track and said light beam on the basis of light reflected from or transmitted through said record carrier, light quantity detection means for detecting light quantity of said light reflected from or transmitted through said record carrier, dividing means for dividing a positional displacement signal of said track displacement detection means by a light quantity signal of said light quantity detection means, tracking control means for controlling said light beam on said record carrier for positioning said light beam on said track, said tracking control means driving said shifting means in accordance with said positional displacement signal or a divide signal of said dividing means, means for reproducing said applied signal recorded on said record carrier on the basis of said light reflected from or transmitted through said record carrier, period detection means for detecting a period while said light beam passes said first region or detecting a predetermined period immediately after said light beam passes said first region on the basis of said applies signal, and off-track detection means for detecting when said light beam is positioned within a predetermined range in said track by said divide signal, and generating an alarm signal when said light beam is out of said predetermined range, said off-track detection means being prevented from generating said alarm signal while said period detection means generates a detection signal.

29. A track jump detection system according to claim 10, wherein said divide signal has a level of Vo when said light beam is positioned at a center line of said track on said record carrier, a pair of signals V1 and V2, wherein V1 is greater than V2 and V1 and V2 have a symmetrical relationship with respect to Vo define said predetermined range, and said off-track detection means decides whether said divide signal having a level of Vx exists within said predetermined range between V1 and V2, and generates said alarm signal when Vx>V1 or Vx<V2.

30. A track jump detection system according to claim 28, wherein said off-track detection means includes comparator means for comparing said positional displacement signal having a level of Vx with said predetermined range defined by two predetermined levels V1 and V2 wherein V1>V2, said comparator means outputting a pulse signal when Vx>V1 or Vx<V2, and deciding means for deciding whether a time period while said comparator means generates said pulse signal exceeds a predetermined count and for generating an excess signal when said time period exceeds said predetermined count.

31. A track jump detection system according to claim 30, wherein said levels of V1 and V2 are set in a symmetrical manner with a level Vo being defined when said light beam on said record carrier is positioned at a center line of said track.

32. A track jump detection system according to claim 28, wherein said period detection means generates a substitute signal when said reproducing means fails to detect said first region after a predetermined time passes.

33. A track jump detection system according to claim 28, wherein said period detection means detects said predetermined period while said light beam passes said first region or detects said predetermined period immediately after said light beam passes said first region, on the basis of a first region signal detected by said reproducing means.

34. A track jump detection system according to claim 28, wherein said period detection means including
first detection means for detecting said first region by said applied signal of said reproducing means,
voltage control oscillating means for changing frequency of its output signal in accordance with its input signal,
comparator means for comparing a phase of said detection output signal of said first detection means with a phase of said output signal of said voltage control oscillating means and generating a difference signal in accordance with a difference between said two phases, and
said voltage control oscillating means being controlled by said difference signal of said comparator means.

* * * * *